(No Model.)
R. PARISH.
PIPE CONNECTION OR COUPLING.
No. 471,735. Patented Mar. 29, 1892.
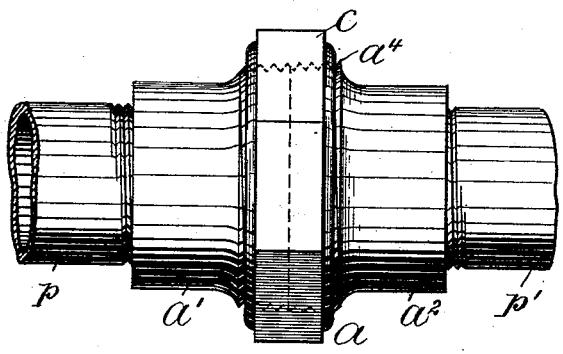
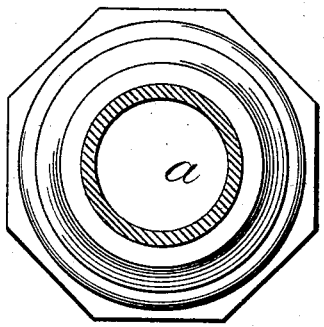
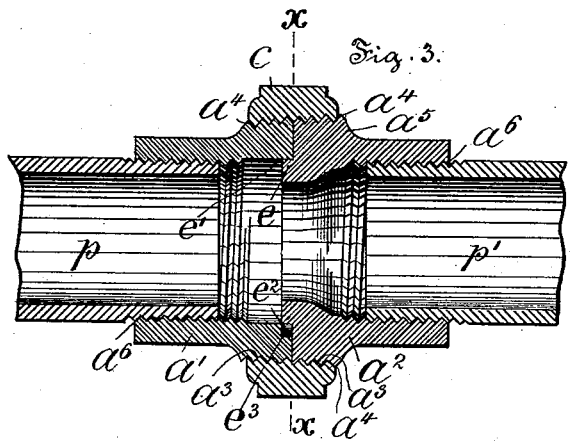
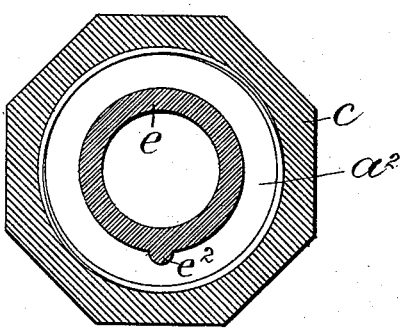
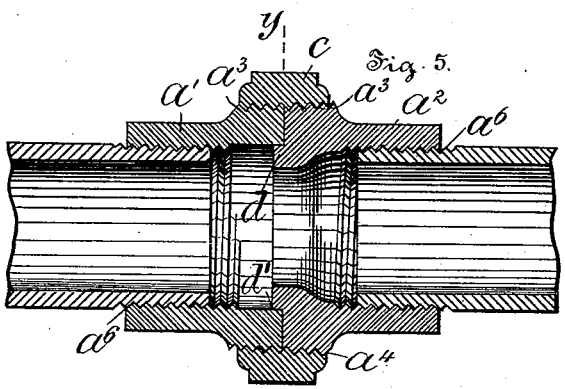
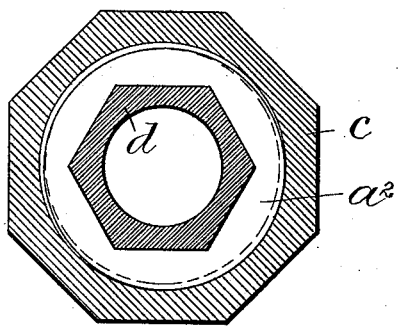
Witnesses:
Hermann Bormann
Thomas M. Smith
Inventor:
Richard Parish,
by J. Walter Douglass.
Att'ys

United States Patent Office.

RICHARD PARISH, OF PHILADELPHIA, PENNSYLVANIA.

PIPE CONNECTION OR COUPLING.

SPECIFICATION forming part of Letters Patent No. 471,735, dated March 29, 1892.

Application filed July 3, 1891. Serial No. 398,333. (No model.)

*To all whom it may concern:*

Be it known that I, RICHARD PARISH, a citizen of the United States, residing at the city of Philadelphia, in the county of Philadelphia and State of Pennsylvania, have invented certain new and useful Improvements in Pipe Connections or Couplings, of which the following is a specification.

The principal objects of my invention are, first, to provide a simple, comparatively inexpensive, and durable pipe connection or coupling adapted to form a tight joint between sections of pipe without the employment of packing, and, second, to so construct and arrange the parts of the coupling that the same may be readily connected or disconnected without rotating or otherwise disturbing the sections of pipe.

My invention consists of a pipe coupling or connection hereinafter described and claimed.

The nature and objects of my present invention will be more fully understood from the following description, taken in connection with the accompanying drawings, forming part hereof, and in which—

Figure 1 is a side elevation of a pipe connection or coupling embodying features of my invention and showing the two thimbles forming part thereof. Fig. 2 is an end elevation, partly in section, of Fig. 1. Fig. 3 is a longitudinal central section through a pipe connection or coupling embodying my invention. Fig. 4 is a section on the line $x$ $x$ of Fig. 3. Fig. 5 is a longitudinal central section through a pipe connection or coupling embodying a modification of my invention, and Fig. 6 is a section on the line $y$ $y$ of Fig. 5.

In the drawings, $a$ is a pipe-coupling comprising two thimbles $a'$ and $a^2$, whereof each is provided with a section $a^3$ of an externally-tapering thread $a^4$. In the present instance each thimble is provided with a flange $a^5$, and the thread $a^4$ is cut or otherwise formed upon the flanges $a^5$, and preference is given to the above manner of their construction, as most excellent results have been thereby obtained. Each thimble is preferably internally tapped or threaded, as at $a^6$, for the reception of an externally-threaded pipe or tube $p$ or $p'$.

$c$ is an internally tapering and threaded nut adapted to engage the tapering thread $a^4$ in such manner that the nut $c$ is screwed tight onto the tapering sections $a^3$, and forming thereby a tight joint between the two thimbles $a'$ and $a^2$.

Inasmuch as a section $a^3$ of the thread $a^4$ is formed upon each of the thimbles $a'$ and $a^2$, it is necessary, in order to screw the nut $c$ onto the thread $a^4$, to provide some means for fitting the two thimbles together in such manner that the two sections of thread $a^3$ will unite and form a continuous thread. This result is accomplished in practice by means of a guide attached to one of the thimbles and adapted to engage a seat formed in the other thimble.

In Figs. 3 and 4 is represented one form of seat and guide comprising a circular bushing $e$, formed on the thimble $a^2$ and adapted to engage a socket $e'$, formed in the thimble $a'$, and also a pin $e^2$, attached to the thimble $a^2$ and adapted to engage in a recess $e^3$, formed in the thimble $a'$, so that the bushing $e$ and socket $e'$ serve to insure the proper alignment of the thimbles, and the pin $e^2$ and recess $e^3$ serve to cause corresponding points on the thread $a^4$ to be brought opposite each other.

In Figs. 5 and 6 is represented another form of seat and guide comprising a polygonal bushing $d$, formed on the thimble $a^2$ and adapted to engage a corresponding polygonal socket $d'$, formed in the thimble $a'$, so that the thimbles are held against rotary motion without the employment of a pin and recess, and may be adjusted so as to cause corresponding parts of the thread $a^4$ to come opposite each other by means of a suitable mark, or in any convenient manner.

To make a joint by means of the hereinabove-described coupling $a$, the nut $c$ is first screwed onto the section $a^3$ of the thread $a^4$, appertaining to the thimble $a'$. The thimbles $a'$ and $a^2$ are then attached to the sections of pipe $p$ and $p'$ in any preferred manner, and the two thimbles $a'$ and $a^2$ are fitted together in such manner that the guide on one of them engages the seat on the other, whereupon the nut $c$ is advanced so as to engage both sections $a^3$ of the thread $a^4$, whereby a tight joint is formed. The pipes $p$ and $p'$ may be readily disconnected by the simple operation of screwing the nut $c$ off the section $a^2$ onto the section $a'$ and then drawing the two thimbles apart.

It may be remarked that excellent results have been attained in practice by first fitting the thimbles $a'$ and $a^2$ together by means of a guide and seat, as has been hereinabove set forth, and then turning up or cutting the continuous thread $a^4$, and hence preference is given thereto.

It will be obvious to those skilled in the art to which my invention appertains that modifications may be made in the details of construction of said coupling or connection—for example, in the form of the guide and seat—without departing from the spirit of the invention, and hence I do not limit myself to the exact construction and arrangement of parts hereinabove described; but,

Having thus described the nature and objects of my invention, what I claim as new, and desire to secure by Letters Patent, is—

1. In a pipe coupling or connection, the combination, with the coupling-sleeves having a clutch formation on their abutting ends, of a continuous tapering screw beginning on one sleeve and ending on the other, and a tapering nut overlapping the meeting faces of said sleeves when screwed onto said tapering screw and binding and forming a tight joint, substantially as and for the purposes set forth.

2. In a detachable pipe coupling or connection provided with an exterior tapering thread and an internally-threaded and tapering nut, two thimbles, each having a faced extremity and provided with a section of the tapering thread and one of said thimbles provided with a key-bushing and the other with a socket corresponding therewith, the construction being such that the faced extremities abut and form a tight joint and the key-bushing and socket shift the sections of the tapering thread into alignment, for the purposes set forth.

In witness whereof I have hereunto set my signature in the presence of two subscribing witnesses.

RICHARD PARISH.

Witnesses:
THOMAS M. SMITH,
RICHARD C. MAXWELL.